United States Patent [19]
Bayly et al.

[11] Patent Number: 5,621,060
[45] Date of Patent: Apr. 15, 1997

[54] SOLVENTLESS TWO COMPONENT PRIMER COMPOSITION FOR IMPROVED ADHESION OF RTV SILICONE ELASTOMERS TO SUBSTRATES

[75] Inventors: Brian P. Bayly, Middle Grove; Gary M. Lucas, Scotia; Van W. Stuart, Clifton Park, all of N.Y.

[73] Assignee: General Electric Company, Waterford, N.Y.

[21] Appl. No.: 630,229

[22] Filed: Apr. 11, 1996

Related U.S. Application Data

[63] Continuation of Ser. No. 400,938, Mar. 8, 1995, abandoned.
[51] Int. Cl.⁶ .................................................. C08G 77/08
[52] U.S. Cl. ......................... 528/17; 528/38; 427/407.1; 427/412.1; 427/322; 427/387
[58] Field of Search ........................... 427/407.1, 412.1, 427/322, 387; 528/17, 38

[56] References Cited

U.S. PATENT DOCUMENTS

| | | |
|---|---|---|
| 3,671,483 | 6/1972 | Young . |
| 4,332,844 | 6/1982 | Hamada et al. . |
| 4,681,636 | 7/1987 | Saito et al. . |
| 4,749,741 | 6/1988 | Saito et al. . |
| 5,238,708 | 8/1993 | Blizzard . |
| 5,302,671 | 4/1994 | Cifuentes et al. ................ 528/17 |

*Primary Examiner*—Melvyn I. Marquis
*Attorney, Agent, or Firm*—Kenneth S. Wheelock

[57] ABSTRACT

A organic solventless two component rapidly curing primer composition comprising a low viscosity dimethylsiloxane oligomer end capped with amino-ethyl-amino-propyl-dimethylsiloxyl and an organotitnate, a process for the manufacture thereof, and a process for the use therewith said primer particularly suited for use with room temperature vulcanizable silicone sealants.

11 Claims, No Drawings

SOLVENTLESS TWO COMPONENT PRIMER COMPOSITION FOR IMPROVED ADHESION OF RTV SILICONE ELASTOMERS TO SUBSTRATES

This is a continuation of application Ser. No. 08/400,938 filed on Mar. 8, 1995 abandoned.

FIELD OF THE INVENTION

The present invention relates to a solventless primer composition for improving the adherence of room temperature vulcanizable silicone elastomeric compositions to various substrates. More particularly the present invention relates to a primer composition comprising a low molecular weight linear dimethyl silicone fluid endcapped with an amino-ethyl-amino-propyl dimethoxysilane and an alkyl titanate.

BACKGROUND OF THE INVENTION

In order to adhere room temperature vulcanizable silicone elastomers to various substrates it has usually been necessary to first coat or treat the substrate with a primer. The typical primers employed for this purpose have heretofore contained an organic solvent and a coupling agent. U.S. Pat. Nos. 4,749,741; 4,681,636, and 3,671,483 disclose such primer compositions.

Because of increasing concerns about the release of volatile organic solvents to the atmosphere in various organic products such as paints, sealants, aerosols, and the like and the deleterious effects on the environment of the release of volatile organic compounds into the environment or atmosphere, it has become desirable to minimize the volatile organic content of many commercially useful products. The absence of solvents, which dilute the effective concentration of high molecular weight materials that are also usually viscous renders the simple removal of solvent from formulations a challenging task. This is because the compositions themselves must be re-formulated and frequently there must be a change in the molecular architecture of the compounds employed in order to secure the same benefits of a given intended product while reducing the amount of volatile organic matter present in the formulation.

In the case of sealants and room temperature vulcanizable silicone compositions some progress towards this goal has been made by recent developments in the art. U.S. Pat. No. 5,238,708 discloses a primer suitable for use with room temperature vulcanizable compositions comprising an organotitanate and a tin carboxylate. U.S. Pat. No. 4,332,844 discloses a composition comprising an alkoxy containing silicone compound, an organohydrogensilicon compound, and an organotitanate that improves the adhesion between a silicone rubber and a substrate.

SUMMARY OF THE INVENTION

The present invention relates to a solventless rapidly curing two component primer composition for room temperature vulcanizable silicone elastomers comprising of from about 100.1 parts by weight to about 120 parts by weight of:

(A) 100 parts by weight of a low viscosity dimethylsiloxane oligomer end capped with amino-ethyl-amino-propyl-dimethoxysiloxyl having the formula:

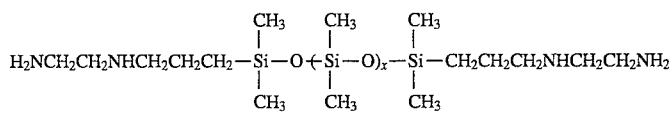

where x varies from about 6 to about 12, and;

(B) from about 0.1 to about 20 parts by weight of an organotitanate having the formula:

where R is a hydrocarbon radical having from 1 to about 8 carbon atoms.

The organotitanate is more preferably selected from the group consisting of tetrabutyl titanate, tetramethyl titanate, tetraisopropyl titanate, ethylmethyldibutyl titanate, tetraoctyl titanate, and tetra-ethylhexyl titanate, and is most preferably tetrabutyl titanate. The range of organotitanate ranges from about 0.1 to about 20 parts by weight in a composition that has a total parts by weight composition of 100.1 parts by weight to about 120 parts by weight, more preferably this range varies from about 0.1 to about 10 parts by weight and most preferably this range varies from about 0.1 to about 5 parts by weight.

The present invention also relates to a process for making a two component rapidly curing primer for room temperature vulcanizable silicone rubber elastomers comprising:

a) reacting a low viscosity dimethylsiloxane oligomer with amino-ethyl-amino-propyl-trimethoxysilane, forming thereby a low viscosity dimethylsiloxane oligomer end capped with amino-ethyl-amino-propyl-dimethoxysiloxyl having the formula:

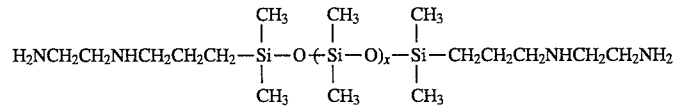

where x varies from about 6 to about 12; and b) mixing therewith an organotitanate having the formula:

where R is a hydrocarbon radical having from 1 to about 8 carbon atoms.

The present invention further relates to a process for applying a sealant to a substrate comprising:

a) priming said substrate with a primer comprising of from about 100.1 parts by weight to about 120 parts by weight of:
  (A) 100 parts by weight of a low viscosity dimethylsiloxane oligomer end capped with amino-ethyl-amino-propyl-dimethoxysiloxyl having the formula:

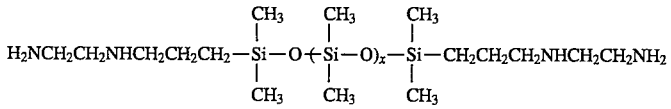

where x varies from about 6 to about 12, and;
  (B) from about 0.1 to about 20 parts by weight of an organotitanate having the formula:

where R is a hydrocarbon radical having from 1 to about 8 carbon atoms;
b) curing said primer on said substrate; and
c) applying thereto a room temperature vulcanizable silicone sealant.

The present invention further relates to a process for applying a sealant to a substrate comprising:
a) priming said substrate with a primer comprising of from about 100.1 parts by weight to about 120 parts by weight of:
  (A) 100 parts by weight of a low viscosity dimethylsiloxane oligomer end capped with amino-ethyl-amino-propyl-dimethoxysiloxyl having the formula:

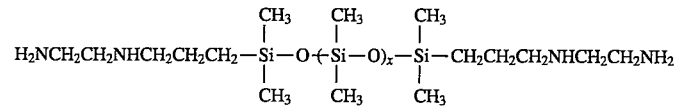

where x varies from about 6 to about 12, and;
  (B) from about 0.1 to about 20 parts by weight of an organotitanate having the formula:

where R is a hydrocarbon radical having from 1 to about 8 carbon atoms;
b) curing said primer on said substrate; and
c) applying thereto a room temperature vulcanizable silicone sealant.

Thus the present invention relates to a composition of matter, a process for preparing that composition, and a use for that composition.

DETAILED DESCRIPTION OF THE INVENTION

The present invention relates to a solventless two component primer for improving the adhesion of room temperature vulcanizable silicone compositions to substrates comprising an organopolysiloxane endcapped with amino-ethyl-amino-propyl dimethoxysiloxyl and an organotitanate. Further such a composition provides a solventless primer, that contains no volatile organic compounds as formulated, thus providing an environmental benefit for its use as well as providing an improved adhesion to various substrates. It is an additional benefit of the composition of the present invention that it undergoes a rapid hydrolytic cure after being applied to a substrate, such cure being sufficiently rapid so that application of silicone room temperature vulcanizable sealants to a substrate primed with composition of the present invention may proceed immediately after the application of the primer. This is particularly convenient in terms of eliminating a waiting period while the primer cures. By solventless applicants define a concentration of volatile organic matter that is below about 5 weight percent of the total weight of the composition, preferably below about 1 weight percent, and most preferably below about 0.25 weight percent.

Thus we now disclose, a solventless rapidly curing two component primer for room temperature vulcanizable silicone elastomers comprising:
  (A) 100 parts by weight of a low viscosity dimethylsiloxane oligomer end capped with amino-ethyl-amino-propyl-dimethoxysiloxyl having the formula:

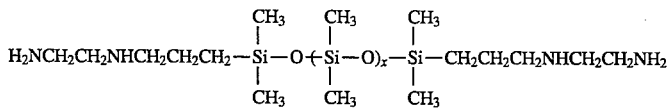

where x varies from about 6 to about 12, and
  (B) 0.1 to about 20 parts by weight of an organotitanate having the formula:

where R is a hydrocarbon radical having from 1 to about 8 carbon atoms. The primer composition thus varies from about 100.1 parts by weight where 100 parts by weight are component (A) and 0.1 parts by weight are parts by weight of component (B) to 120 parts by weight where 100 parts by weight are component (A) and 20 parts by weight are component (B).

Compounds which are exemplary of the organotitanate and which are preferred are: tetrabutyl titanate, tetramethyl titanate, tetraisopropyl titanate, ethylmethyldibutyl titanate, tetraoctyl titanate, and tetraethylhexyl titanate. The most preferred titanate is tetrabutyl titanate. The organotitanate is more preferably selected from the group consisting of tetrabutyl titanate, tetramethyl titanate, tetraisopropyl titanate, ethylmethyldibutyl titanate, tetraoctyl titanate, and tetra-ethylhexyl titanate, and is most preferably tetrabutyl titanate. The range of organotitanate ranges from about 0.1 to about 20 parts by weight in a composition that has a total parts by weight composition of 100.1 parts by weight to about 120 parts by weight, more preferably this range varies from about 0.1 to about 10 parts by weight and most preferably this range varies from about 0.1 to about 5 parts by weight.

The present invention also relates to a process for making a two component rapidly curing primer for room temperature vulcanizable silicone rubber elastomers comprising:

a) reacting a low viscosity dimethylsiloxane oligomer with amino-ethyl-amino-propyl-trimethoxysilane, forming thereby a low viscosity dimethylsiloxane oligomer end capped with amino-ethyl-amino-propyl-dimethoxysiloxyl having the formula:

$$H_2NCH_2CH_2NHCH_2CH_2CH_2-\underset{\underset{CH_3}{|}}{\overset{\overset{CH_3}{|}}{Si}}-O(\underset{\underset{CH_3}{|}}{\overset{\overset{CH_3}{|}}{Si}}-O)_x-\underset{\underset{CH_3}{|}}{\overset{\overset{CH_3}{|}}{Si}}-CH_2CH_2CH_2NHCH_2CH_2NH_2$$

where x varies from about 6 to about 12; and b) mixing therewith an organotitanate having the formula:

$$Ti(OR)_4$$

where R is a hydrocarbon radical having from 1 to about 8 carbon atoms.

The present invention further relates to a process for applying a sealant to a substrate comprising:

a) priming said substrate with a primer comprising of from about 100.1 parts by weight to about 120 parts by weight of:
(A) 100 parts by weight of a low viscosity dimethylsiloxane oligomer end capped with amino-ethyl-amino-propyl-dimethoxysiloxyl having the formula:

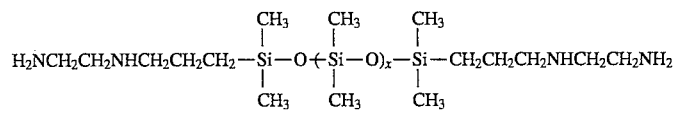

where x varies from about 6 to about 12, and;
(B) from about 0.1 to about 20 parts by weight of an organotitanate having the formula:

$$Ti(OR)_4$$

where R is a hydrocarbon radical having from 1 to about 8 carbon atoms;

b) curing said primer on said substrate; and c) applying thereto a room temperature vulcanizable silicone sealant.

The present invention further relates to a process for applying a sealant to a substrate comprising:

a) priming said substrate with a primer comprising of from about 100.1 parts by weight to about 120 parts by weight of:
(A) 100 parts by weight of a low viscosity dimethylsiloxane oligomer end capped with amino-ethyl-amino-propyl-dimethoxysiloxyl having the formula:

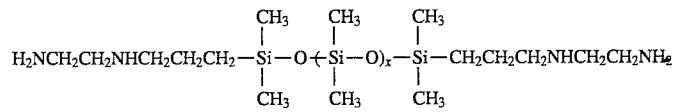

where x varies from about 6 to about 12, and;
(B) from about 0.1 to about 20 parts by weight of an organotitanate having the formula:

$$Ti(OR)_4$$

where R is a hydrocarbon radical having from 1 to about 8 carbon atoms;

b) curing said primer on said substrate; and

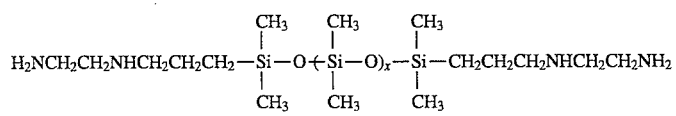

c) applying thereto a room temperature vulcanizable silicone sealant.

Because this formulation is highly sensitive to the presence of water, undergoing a rapid hydrolytically catalyzed cure, it should be prepared and stored under essentially anhydrous conditions.

All of the United States Patents referenced herein are hereby and herewith specifically incorporated by reference.

Experimental

Preparation of Dimethylsiloxane Oligomer:

A suitable reaction vessel, equipped with an agitator, heater, nitrogen purge, and a vacuum source was charged with 109 parts by weight dry acetone, 10 parts by weight water, and 2 parts by weight Bentonite clay quartz (Super Filtrol grade #20). These ingredients were mixed at a moderate speed for 15 minutes. To this mixture was added 100 parts by weight molten methyl trimer (hexamethyltrisiloxane) and mixed with heating at a temperature ranging from 50° to 60° C. for six hours, at which time the percentage of unreacted trimer had been reduced to less than 5%. At this point, 1.3 parts by weight magnesium oxide and 1.0 parts by weight calcined diatomaceous earth (Celite 545®) were charged to reaction mixture and mixed for 30 minutes. The reaction mixture was cooled to 25° C. and filtered. Acetone was removed from the reaction mixture by stripping under a partial vacuum under conditions where the temperature never exceeded 55° C. This resulted in the isolation of the dimethylsiloxane oligomer. After being cooled to 25° C. the dimethylsiloxane oligomer was analyzed and found to have a silanol level of 5–8 weight percent, a viscosity of 3–10 cps, and a residual trimer level below 5 weight percent. The preparation was colorless.

Preparation of amino-ethyl-amino-propyl-dimethoxy stopped dimethylsiloxane oligomer:

A suitable reaction vessel, equipped with an agitator, heater, nitrogen purge, and a vacuum source was charged with 100 parts by weight of dimethylsiloxane oligomer, prepared as previously described, and was heated to 70°–90° C. while stirring. A solution consisting of 42 parts by weight amino-ethyl-amino-propyl-trimethoxysilane, 5.1 parts by weight di-butylamine, and 2.4 parts by weight acetic acid was charged to the reaction mixture and mixed for 30 minutes at a temperature of 70°–90° C. under a nitrogen purge. The mixture was cooled to 40°–60° C. and 15 parts by weight hexamethyldisilazane was charged and mixed for 30 minutes. The mixture was placed under vacuum for 30 minutes to de-gas and then cooled to room temperature.

The following experiments were conducted using 1×4 inch panels of anodized aluminum that had been cleaned by washing with isopropanol. A thin film of candidate primer was then applied with a clean dry cloth. Immediately following application of the primer, ASTM-C-794 (peel adhesion specimens) specimens were prepared. The following sealants were tested for cohesive failure after being allowed to cure for ten days on the primed aluminum panels:

Sealant A: A silicone room temperature vulcanizable composition using a tin catalyzed alkoxy cure.

Sealant B: A Silicone room temperature vulcanizable composition using a tin catalyzed acetoxy cure.

Sealant C: A silicone room temperature vulcanizable composition using a titanate catalyzed alkoxy cure.

Experiment 1

Primer: amino-ethyl-amino-propyl-dimethoxy stopped dimethylsiloxane oligomer.

| Sealant | Average Pull lb/in. | % Cohesive Failure |
|---|---|---|
| A | 47 | 30 |
| B | 4 | 0 |
| C | 36 | 90 |

Experiment 2

Primer: 99 parts by weight amino-ethyl-amino-propyldimethoxy stopped dimethylsiloxane oligomer and 1 part by weight tetrabutyl titanate.

| Sealant | Average Pull lb/in. | % Cohesive Failure |
|---|---|---|
| A | 28 | 45 |
| B | 4 | 0 |
| C | 46 | 90 |

Experiment 3

Primer: 97 parts by weight amino-ethyl-amino-propyldimethoxy stopped dimethylsiloxane oligomer and 3 parts by weight tetrabutyl titanate.

| Sealant | Average Pull lb/in. | % Cohesive Failure |
|---|---|---|
| A | 34 | 90 |
| B | 9 | 15 |
| C | 33 | 90 |

Experiment 4

Primer: 95 parts by weight amino-ethyl-amino-propyl-dimethoxy stopped dimethylsiloxane oligomer and 5 parts by weight tetrabutyl titanate.

| Sealant | Average Pull lb/in. | % Cohesive Failure |
|---|---|---|
| A | 35 | 95 |
| B | 27 | 70 |
| C | 45 | 100 |

Experiment 5

Primer: none, using unprimed anodized aluminum.

| Sealant | Average Pull lb/in. | % Cohesive Failure |
|---|---|---|
| A | 44 | 40 |
| B | 7.5 | 0 |
| C | 21 | 10 |

Experiment 6

At a level of 10 parts by weight tetrabutyl titanate with 90 parts by weight amino-ethyl-amino-propyl-dimethoxy stopped dimethylsiloxane oligomer, the hydrolysis rate increased to the point where substrate priming was not practical by the method used in the previous tests. Other methods of priming presently available or yet to be developed may render higher levels of organotitanate suitable for use in priming formulations.

Explanation of results:

Cohesive failure is defined as a splitting of the sealant within the sealant layer itself, substantially down the middle when the sample is pulled to destruction. Adhesive failure is a failure of the sealant to adhere to a substrate when pulled to destruction. Based on the results presented in experiments 1 through 5, while there was essentially no adhesive failure, there was an increased cohesive failure, indicating the success of the primer composition in maintaining adherence of the sealant to the primer and the primer to the substrate. Cohesive failure thus indicates a failure of the sealant within the sealant layer as distinguished from what the sealant may be bonded to in terms of substrate or primer.

Having described the invention that which is claimed is:

1. A rapidly curing two component primer composition for room temperature vulcanizable silicone elastomers said primer consisting essentially of from about 100.1 parts by weight to about 120 parts by weight of:

(A) 100 parts by weight of a low viscosity dimethylsiloxane oligomer end capped with amino-ethyl-amino-propyl-dimethoxysiloxyl having the formula:

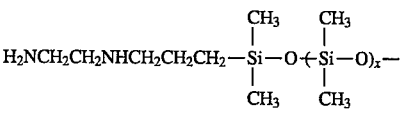

—Si(CH3)(CH3)—CH2CH2CH2NHCH2CH2NH2 where x varies from about 6 to about 12, and;
(B) from about 0.1 to about 20 parts by weight of an organotitanate having the formula:

Ti(OR)$_4$ where R is a hydrocarbon radical having from 1 to about 8 carbon atoms.

2. The composition of claim 1 wherein the organotitanate is selected from the group consisting of tetrabutyl titanate, tetramethyl titanate, tetraisopropyl titanate, ethylmethyldibutyl titanate, tetraoctyl titanate, and tetra-ethylhexyl titanate.

3. The composition of claim 2 wherein the organotitanate is tetrabutyl titanate.

4. The composition of claim 1 wherein the quantity of the organotitanate ranges from about 0.1 parts by weight to about 10 parts by weight.

5. The composition of claim 1 wherein the quantity of the organotitanate ranges from about 0.1 parts by weight to about 5 parts by weight.

6. The composition of claim 5 wherein the organotitanate is selected from the group consisting of tetrabutyl titanate, tetramethyl titanate, tetraisopropyl titanate, ethylmethyldibutyl titanate, tetraoctyl titanate, and tetra-ethylhexyl titanate.

7. The composition of claim 6 wherein the organotitanate is tetrabutyl titanate.

8. A process for making a two component rapidly curing primer for room temperature vulcanizable silicone rubber elastomers consisting essentially of:

a) reacting a low viscosity dimethylsiloxane oligomer with amino-ethyl-amino-propyl-dimethoxysilane, forming thereby a low viscosity dimethylsiloxane oligomer end capped with amino-ethyl-amino-propyl-dimethoxysiloxyl having the formula:

H2NCH2CH2NHCH2CH2CH2—Si(CH3)(CH3)—O—(Si(CH3)(CH3)—O)$_x$—

—Si(CH3)(CH3)—CH2CH2CH2NHCH2CH2NH2 where x varies from about 6 to about 12; and
b) mixing therewith an organotitanate having the formula:

Ti(OR)$_4$ where R is a hydrocarbon radical having from 1 to about 8 carbon atoms.

9. The process of claim 8 wherein the organotitanate is selected from the group consisting of tetrabutyl titanate, tetramethyl titanate, tetraisopropyl titanate, ethylmethyldibutyl titanate, tetraoctyl titanate, and tetra-ethylhexyl titanate.

10. The process of claim 9 wherein the organotitanate is tetrabutyl titanate.

11. A process for applying a sealant to a substrate comprising:

a) priming said substrate with a primer consisting essentially of from about 100.1 parts by weight to about 120 parts by weight of:

(A) 100 parts by weight of a low viscosity dimethylsiloxane oligomer end capped with amino-ethyl-amino-propyl-dimethoxysiloxyl having the formula:

H2NCH2CH2NHCH2CH2CH2—Si(CH3)(CH3)—O—(Si(CH3)(CH3)—O)$_x$—

—Si(CH3)(CH3)—CH2CH2CH2NHCH2CH2NH2 where x varies from about 6 to about 12, and;
(B) from about 0.1 to about 20 parts by weight of an organotitanate having the formula:

Ti(OR)$_4$ where R is a hydrocarbon radical having from 1 to about 8 carbon atoms;

b) curing said primer on said substrate; and
c) applying thereto a room temperature vulcanizable silicone sealant.

* * * * *